United States Patent [19]
Andressen

[11] 3,971,939
[45] July 27, 1976

[54] UNITARY LASSER/IR SEEKER

[75] Inventor: Clarence C. Andressen, Fredericksburg, Va.

[73] Assignee: The United States of America as represented by the Secretary of the Navy, Washington, D.C.

[22] Filed: Aug. 19, 1975

[21] Appl. No.: 605,951

[52] U.S. Cl. ............................. 250/339; 250/342; 250/347
[51] Int. Cl.² ........................................... G01J 1/00
[58] Field of Search .......... 250/334, 339, 341, 347, 250/350, 353, 373, 492, 342

[56] References Cited
UNITED STATES PATENTS 2,974,227  3/1961  Fisher et al. ...................... 250/373
3,856,406  12/1974  Noble ................................ 250/339

Primary Examiner—Harold A. Dixon
Attorney, Agent, or Firm—R. Sciascia; R. Beers; S. Sheinbein

[57] ABSTRACT

A combination of a wobble-scan infrared (IR) seeker with an unscanned pulsed laser (L) seeker. Target IR&L energy is passed through a focusing lens system to a wedge filter which is mounted on a rotating gyro-stabilized platform. The filter separates the IR&L signals by reflecting the L signal from its top surface and the IR signal from its bottom, slanted surface. The L signal is focused on a quad cell detector and detected. The IR signal passes through this detector and is sent through a reticle which pulse-codes it. The pulse-coded IR energy is then focused by another lens on an IR detector.

14 Claims, 1 Drawing Figure

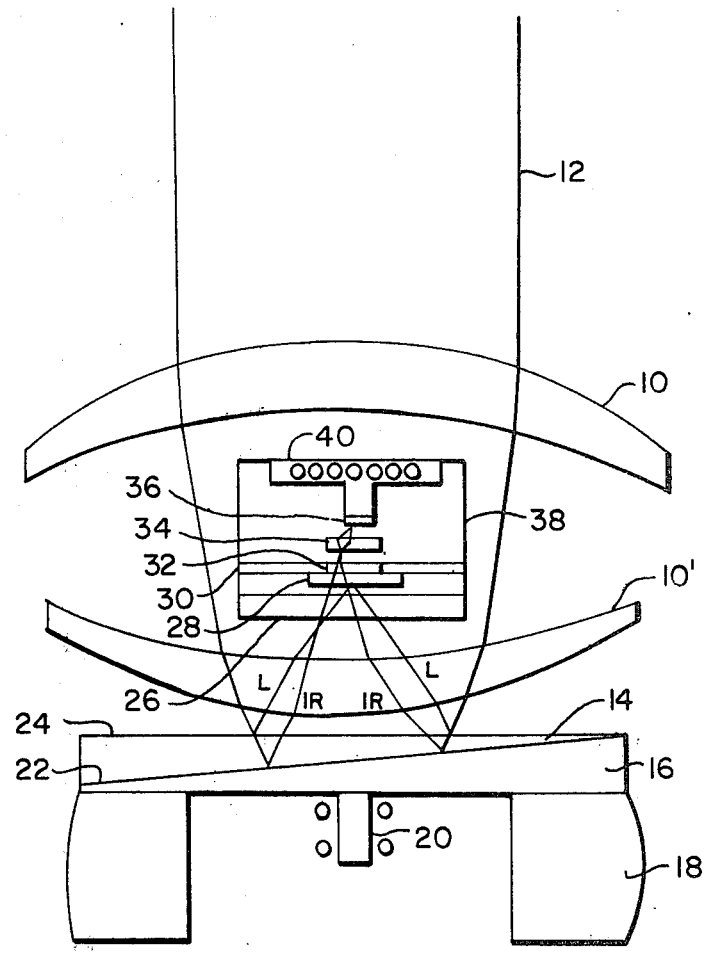

UNITARY LASSER/IR SEEKER

BACKGROUND OF THE INVENTION

This invention relates to infrared and laser target detection systems and especially to a combined seeker for such systems.

Military projectiles are now sufficiently sophisticated to employ target-seeking systems in the projectile itself which guide the projectile to the target. The systems work on different types of energy. One such system homes in on infrared energy emitted by the target itself. Another system homes in on laser energy reflected from the target and sent out by a pulsed laser transmitter.

Each of these systems has certain advantages not possessed by the other which make it more efficient against certain types of target and less efficient against others. A combination of the two types of system would thus be very desirable. However, room in a projectile is limited and it would be very desirable to be able to reduce the room required by the systems by using a single seeker instead of the two now required if an IR and an L system are to be located in the same projectile.

SUMMARY OF THE INVENTION

The objects and advantages of the present invention are accomplished by the use of a gyro-stabilized, rotating, spectral filter which is wedge-shaped to enable incoming IR&L energy to be focused at different points separated from one another and to be focused at different points in a combined IR&L seeker so that the different types of energy can be separately detected.

An object of the invention is to reduce the room required by target-seeking systems when IR&L systems are to be employed simultaneously at any location.

A further object is to combine the seekers of an IR&L target-seeking system into a single unit.

Other objects, advantages and novel features of the present invention will become apparent from the following detailed description of the invention when considered in conjunction with the accompanying drawing.

BRIEF DESCRIPTION OF THE DRAWING

The single FIGURE is a schematic illustration of an embodiment of the invention.

DETAILED DESCRIPTION OF THE INVENTION

The combined IR&L seeker shown in the figure employs a body-fixed lens system separated into two spaced components 10 and 10' to focus infrared (IR) and laser (L) energy 12 impinging on the lens 10. (The term "body-fixed" indicates that the lens is affixed to the body of the projectile.)

The converging rays are directed on a wedge-shaped spectral filter having a front wedge 14 and a rear wedge 16 which are bonded together. The wedge filter is gyro-stabilized to a fixed reference point in space by being mounted on a gyroscope 18. The purpose of the rear wedge 16 is solely to orient the front wedge 14. A spin shaft 20 rotates the wedge filter. The rear surface 22 of the front wedge 14 is aluminized to form a flat mirror which is angled with respect to the gyro axis of rotation. This internal, angled mirror produces the scan and increased focal length needed to separate the IR from the L signal. The front surface 24 of the front wedge 14 is coated with a long-wavelength pass material such as silicon. This reflects 1.06 micron energy to give the mirror necessary for the laser seeker but is transparent to energy having a wavelength greater than 1.2 microns (IR energy is greater than 2 microns). Thus, as can be seen in the figure, the L energy is reflected from the front surface 24 of the front wedge while the IR energy passes through the front wedge to be reflected from its rear surface 22.

The L energy is focused on a detector 28 for L energy, such as a silicon quad cell which is transparent to IR energy. The L energy detector 28 is mounted to a housing 38 by means of a mounting board 30 which has a small hole in it in which a reticle 32 is located. A slightly defocused image is formed on the quad cell producing the linear region (rather than spot) needed for creating the difference signals necessary to measure properly any target shift and to generate proportional control signals therefrom. The IR reticle 32 has alternate areas which are transmissive for and opaque to IR energy and acts to position-encode the IR energy by time modulation.

The nodal point of the lens system is in the vicinity of the detector 28 and reticle 32 and the IR energy focuses at or near the nodal point so that body motion of the projectile is decoupled from the lens system.

The IR energy which has passed through the reticle 32 is then refocused by the field lens 34 on an IR energy detector 36 which is housed in, or has contact with, a cooling device 40. The IR energy detector 36 may, for example, be photocell amplitude detector.

The detectors are coupled to further equipment (not shown) which processes the detected signals.

Both the IR&L signals, after focusing by the lens system but before detection, are passed through a dual bandpass filter 26 which passes both the IR and the L energy but eliminates stray light which could result in a high noise level.

The wedge filter can be made of many materials, such as pure silicon or germanium. The material must reflect 1 micron radiation (L energy) but transmit 2 micron radiation or greater (IR energy). The dual bandpass filter could be put in the wedge filter at a trade-off of complexity.

In operation, both IR&L incoming signals are converged by the body-fixed lens system 10, 10'. The L signal is reflected by the front surface 24 of the front wedge of the wedge spectral filter and focused on the L energy detector 28.

The incoming converging IR signal passes through the front wedge 14 to its sloping rear surface 22 and is reflected therefrom to focus ahead of the focal point of the L energy. The focus point is also displaced laterally from the focal point of the L energy because of the slope of the rear reflecting surface. Since the wedge and its rear surface are spinning, the focus of the IR signal rotates in a circle around the IR reticle with the focal point of the L energy at the center of the circle. Rotation of the IR signal around the alternate transmissive and opaque areas of the reticle acts to time-modulate the signal resulting in a position-encoding of the IR signal which is useful for guiding the projectile.

The position-encoded IR signal which passes through the reticle 32 is focused by a field lens 34 on the IR detector 36.

Obviously, many modifications and variations of the present invention are possible in light of the above teachings. It is therefore to be understood that, within the scope of the appended claims, the invention may be practiced otherwise than as specifically described.

What is claimed is:

1. A combination infrared (IR) and laser (L) seeker comprising:
    spectral filter means which is transmissive to IR energy and non-transmissive to L energy, said means having a front surface and a rear surface which slopes with respect to said front surface, the rear surface being coated to reflect IR energy and the front surface being reflective to L energy;
    spinning gyroscope means on which said spectral filter means is mounted to spin therewith;
    lens means forward of said filter means for focusing incoming IR and L energy, the energy emerging from the lens being converged on the front surface of said spectral filter means, L energy being reflected forward from the front surface and IR energy being reflected forward from the rear surface to a more forward focal point than the focal point of the L energy, the focused IR energy moving in a circle around the focused L energy as the spectral filter means spins;
    L-energy detection means on which the reflected L energy is focused;
    IR-energy detection means; and
    lens means in the path of said reflected IR energy for focusing it on said IR detection means.

2. A seeker as in claim 1, wherein said L energy detection means is transparent to IR energy and the IR energy reflected by the spectral filter means passes through the L energy detection means.

3. A seeker as in claim 1, wherein said L energy detection means is a quad cell.

4. A seeker as in claim 1, further including a reticle in the path of the converging reflected IR energy for position-encoding the energy.

5. A seeker as in claim 1, further including a dual bandpass filter having pass regions which allow IR and L energy to pass through but which is non-transmissive to other optical energy, said bandpass filter being located in the path of said converging IR&L energy before it reaches any detection means.

6. A seeker as in claim 3, wherein said quad cell is located at such a point with respect to the focal point of the L energy that a slightly defocused image of the L energy is formed on the quad cell.

7. A combination infrared (IR) and laser (L) seeker for IR&L target-seeking systems comprising:
    a wedge spectral filter which is transmissive to IR energy and non-transmissive to L energy, said filter having a flat front surface and an angled rear surface so that the filter is wedge-shaped, the front surface being reflective to L energy and the rear surface being reflective to IR energy;
    gyroscope means including a gyro on which said filter is mounted for spinning said filter and stabilizing it with respect to the gyro spatial reference point, the plane of the front surface of said filter being perpendicular to the spinning axis of the gyro;
    a field lens mounted forward of said filter for focusing incoming IR&L energy, the lens converging said energy on said filter, L energy being reflected forward from the front surface and IR being reflected forward from the rear surface to a more forward focal point than the L energy, the focused IR energy circling the focused L energy as the filter spins;
    a quad cell for detecting the focused L energy;
    a reticle, mounted just forward of said quad cell, for position-encoding said reflected IR energy;
    an IR-energy detector mounted forward of said reticle; and
    a field lens mounted between said reticle and said IR detector in the path of the reflected IR energy for focusing it on said IR energy detector.

8. A seeker as in claim 7, wherein said quad cell is transparent to IR energy and the coverging IR energy passes through it on its way to the IR detector.

9. A seeker as in claim 7, further including a dual bandpass filter having pass regions which allow IR&L energy to pass through but which is non-transmissive to other optical energy, said bandpass filter being located in the path of the converging IR&L energy before it reaches any detector.

10. A seeker as in claim 7, wherein the IR detector is an IR sensitive photocell.

11. A seeker as in claim 7, wherein the quad cell and the reticle are made of silicon.

12. A seeker as in claim 7, wherein said quad cell is located at such a point with respect to the focal point of the L energy that a slightly defocused image of the L energy is formed on the quad cell.

13. A seeker as in claim 7, said seeker being mounted in a projectile object and said field lens being fixedly mounted with respect to the body of said projectile.

14. A unitary device for detecting infrared (IR) and laser (L) energy from an object comprising:
    spectral filter means which is transmissive to IR energy and non-transmissive to L energy, said means having a front surface and a rear surface, the rear surface being coated to reflect IR energy and the front surface being reflective to L energy;
    spinning gyroscope means on which said spectral filter means is mounted to spin therewith;
    lens means forward of said filter means for focusing incoming IR and L energy, the energy emerging from the lens being converged on the front surface of said spectral filter means, L energy being reflected forward from the front surface and IR energy being reflected forward from the rear surface to a more forward focal point than the focal point of the L energy;
    L-energy detection means on which the reflected L energy is focused;
    IR-energy detection means on which the reflected L energy is focused; and
    lens means in the path of said reflected IR energy for focusing it on said IR detection means.

* * * * *